J. F. WING.
CAR DOOR SEAL.
APPLICATION FILED SEPT. 17, 1908.
12,883.
Reissued Nov. 24, 1908.
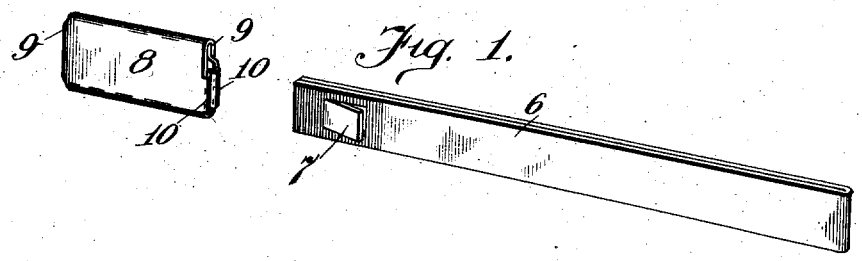
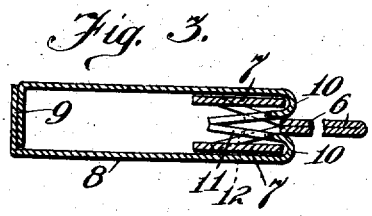
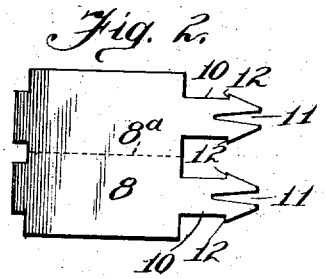
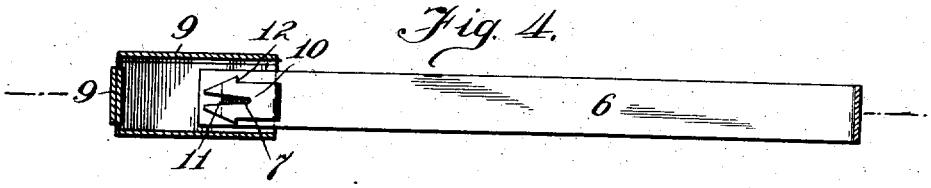
Witnesses
Milton Lenoir
E. M. Hatcher
Inventor
John F. Wing.
By Gillson & Gillson
Attorneys.

UNITED STATES PATENT OFFICE.

JOHN F. WING, OF MAYWOOD, ILLINOIS.

CAR-DOOR SEAL.

No. 12,883. Specification of Reissued Letters Patent. Reissued Nov. 24, 1908.

Original No. 889,286, dated June 2, 1908, Serial No. 372,491. Application for reissue filed September 17, 1908. Serial No. 453,565.

*To all whom it may concern:*

Be it known that I, JOHN F. WING, a citizen of the United States, residing at Maywood, in the county of Cook and State of Illinois, have invented certain new and useful Improvements in Car-Door Seals, of which the following is a specification.

This invention relates to seals particularly adapted for use in connection with car doors or the like; the object of the invention is to provide an improved and simple seal which may be locked without the use of any tool and which cannot be unlocked without being destroyed.

In the accompanying drawings, Figure 1 is a perspective view of the seal, the shackle being disengaged; Fig. 2 is a plan view of the blank from which the head or locking piece of the seal is made; Fig. 3 is a sectional view lengthwise of the seal; Fig. 4 is a sectional view showing the interior of one side of the head, in plan.

In both forms of the device the shackle is made the same way, consisting of a strip of metal 6 having at each end a tongue 7 struck up therefrom. These tongues engage cooperative tongues or hooks in the head, and the points or free ends of the tongues 7 are presented on the outer side of the shackle when it is folded, and toward the bend of the shackle.

In one form, the head consists of a body 8 which when the seal is made is folded lengthwise upon the line $8^a$, and the free edges thereof, at the side and rear end, are soldered or crimped together, as indicated at 9, so as to form a head or casing closed around its edges, except at the front end which is left open to receive the ends of the shackle, and which are slipped therein.

The blank 8 has at one end a pair of tongues 10 which are bent or folded back upon the inner surface of the blank before said blank is doubled and closed. There is one of these tongues on each side of the middle or line $8^a$ of the blank, and when the parts are folded as stated the tongues are located opposite to each other on the inside of the head.

In the form shown in Figs. 2, 3 and 4, the tongues 10 are split as indicated at 11, from the end thereof, for a part of their length, and have on each side, near the end, a shoulder 12, the end of the tongues being inclined or beveled from said shoulders toward the point thereof.

When the seal is to be applied or locked, the ends of the shackle are slipped in the open end of the head until the tongues 7 pass beyond the ends of the tongues 10. Then the shackle is drawn or pulled in an outward direction, causing the tongues 7 to engage under or behind the tongues 10, and causing the latter to enter and pass through the openings in the ends of the shackle behind the tongues 7, said openings being produced when said tongues are struck up. The distance between the points of the shoulders 12 of each tongue is somewhat greater than the width of the opening in the end of the shackle, but nevertheless the shoulders may be sprung through said opening by a sufficient pull on the shackle, the yielding action being permitted by the slot 11, which allows the opposite parts of the tongue to be pressed toward each other and so allows the shoulders 12 to pass through the opening in the end of the shackle. After said shoulders pass through said opening their square edges will engage against or behind the edges of the opening in the shackle, and consequently the shackle cannot be pushed in or otherwise manipulated to disengage the tongues 10 and 7, or to allow any blade or similar device to be introduced into the seal for the purpose of effecting such disengagement. In other words the end of the shackle is locked against being pulled out, by means of the hook or engagement of the tongues 10 and 7 with each other, and inward push on the end of the shackle, with intent to disengage said tongues, is prevented by the engagement of the shoulders 12 with the edge of the opening through which the tongue extends. Both ends of the shackle are caught and locked in the same way.

I claim:

1. A seal comprising a shackle having an opening in the end, and a head or casing having a split and tapered elastic tongue therein and adapted to receive the end of the shackle, said tongue being adapted to hook into and spring through said opening and having shoulders presented toward the entrance into the head and engaging the edges of the opening when the tongue is sprung through the same and preventing retraction thereof from the opening.

2. A seal comprising a shackle having tongues struck up at opposite ends thereof and forming openings in said ends, and a head having opposite inwardly-presented tongues therein, adapted to interlock with said tongues and project through the openings, said tongues in the head being tapered and split lengthwise to spring through the openings and having projecting shoulders engageable with the edges of the openings to prevent retraction after passing therethrough.

3. A seal comprising a shackle having a tongue struck up at its end to form an opening, and a head having an inwardly-presented tongue therein adapted to interlock with the shackle tongue and project through its opening, said tongue in the head being tapered and adapted to spring through the shackle opening and having shoulders engageable with the edges of such opening to prevent retraction after passing therethrough.

4. A seal comprising, in combination, a shackle having a backwardly-directed tongue struck up adjacent its end to form an opening, and a chambered head having a shackle-receiving opening at one end and a barbed tongue projecting inwardly from the opening and adapted to enter the opening in the shackle as the latter moves outwardly after insertion.

5. A seal comprising, in combination, a strap shackle having an opening adjacent its end, a chambered head having a throat oblong in cross-section for receiving the shackle, and a barbed tongue projecting backwardly from the throat, its flat face being parallel with the side thereof, such tongue being adapted to enter the opening in the shackle as the latter moves outwardly after insertion into the head.

6. A seal comprising, in combination, a strap shackle having an opening adjacent its end, a chambered head having a throat at one end, and a flat barbed tongue projecting inwardly from the open end of the head and obliquely across the throat, the flat face of the tongue being parallel with the head opening and its width at the tip of the barb being normally greater than the normal width of the opening in the shackle.

JOHN F. WING.

Witnesses:
LOUIS K. GILLSON,
E. M. KLATCHER.